(12) United States Patent
Rudy

(10) Patent No.: US 8,043,007 B2
(45) Date of Patent: Oct. 25, 2011

(54) HYDROSTATIC PROFILE RAIL GUIDE

(75) Inventor: Dietmar Rudy, Kleinbundenbach (DE)

(73) Assignee: Schaeffler KG, Herzogenaurach (DE)

( * ) Notice: Subject to any disclaimer, the term of this patent is extended or adjusted under 35 U.S.C. 154(b) by 439 days.

(21) Appl. No.: 12/297,597

(22) PCT Filed: Apr. 19, 2007

(86) PCT No.: PCT/EP2007/053851
§ 371 (c)(1),
(2), (4) Date: Dec. 11, 2008

(87) PCT Pub. No.: WO2007/122180
PCT Pub. Date: Nov. 1, 2007

(65) Prior Publication Data
US 2009/0252441 A1  Oct. 8, 2009

(30) Foreign Application Priority Data
Apr. 20, 2006  (DE) .................. 10 2006 018 312

(51) Int. Cl.
*F16C 32/06* (2006.01)
(52) U.S. Cl. .......................................................... 384/12
(58) Field of Classification Search .......... 384/12, 384/45
See application file for complete search history.

(56) References Cited

U.S. PATENT DOCUMENTS

| 3,583,774 | A | * | 6/1971 | De Gast ........................ 384/12 |
| 4,527,842 | A | * | 7/1985 | Teramachi ..................... 384/45 |
| 4,978,233 | A | * | 12/1990 | Stotzel et al. ................. 384/12 |
| 5,011,300 | A | * | 4/1991 | Teramachi ..................... 384/45 |
| 5,971,614 | A | * | 10/1999 | Kane et al. .................... 384/12 |
| 5,980,110 | A |   | 11/1999 | Lyon |

FOREIGN PATENT DOCUMENTS

| DE | 15 25 051 Y | 5/1969 |
| DE | 19 25 828 Y | 6/1970 |
| DE | 34 19 401 Y | 5/1985 |
| DE | 38 31 676 A | 1/1990 |
| DE | 39 90 964 Y | 2/1996 |
| JP | 2002 142433 A | 5/2002 |
| WO | 99/53207 | 10/1999 |

\* cited by examiner

*Primary Examiner* — Thomas R Hannon
(74) *Attorney, Agent, or Firm* — Lucas & Mercanti, LLP

(57) ABSTRACT

Hydrostatic profile rail guide with a guide carriage that is hydrostatically mountable on a guide rail, whereby the guide carriage features a back and two sides that are attached to the back, between which the guide rail is located, whereby the back features a mounting surface on the side facing away from the guide rail for the mounting of, for example, a machine part, with the mounting surface concave when seen in the longitudinal direction of the guide rail.

4 Claims, 4 Drawing Sheets

HYDROSTATIC PROFILE RAIL GUIDE

This application is a 371 of PCT/EP2007/053851 filed Apr. 19, 2007, which in turn claims the priority of DE 10 2006 018 312.6 filed Apr. 20, 2006, the priority of both applications is hereby claimed and both applications are incorporated by reference herein.

FIELD OF THE INVENTION

The present invention relates to a hydrostatic profiled rail guide, having a guide carriage which can be mounted hydrostatically on a guide rail.

BACKGROUND OF THE INVENTION

DE 38 31 676 C1, for example, has disclosed a hydrostatic profiled rail guide, in which a guide carriage is mounted hydrostatically on a guide rail. The guide rail is provided with a center face which extends along its longitudinal axis and with two upper bearing faces which are arranged on both longitudinal sides of the center face and are arranged such that they are inclined with respect to said center face. Below each upper bearing face, a lower bearing face is provided which is arranged such that it is inclined with respect to said upper bearing face and with respect to the center face. As viewed in cross section through the profiled rail guide, a triangle is defined by an imaginary first parallel straight line to the center face, by an imaginary second parallel straight line to the upper bearing face and by an imaginary third parallel straight line to the lower bearing face. In this triangle, first and the second straight lines. Furthermore, an angle $\gamma$ is formed in this triangle between the first and the third straight lines.

Two emergency running faces which delimit an angle $\beta$ of at most 90° with the lower bearing faces of the head region are provided in the foot region of the guide rail on its two longitudinal sides below said two upper and lower bearing faces which are provided in the head region of the guide rail.

The guide carriage which is placed onto the guide rail is likewise provided with upper and lower bearing faces which interact with the upper and lower bearing faces of the guide rail. Pressure pockets are formed between the respective bearing faces of the guide rail and the guide carriage, in which pressure pockets a hydrostatic pressure can be built up. The hydrostatic pressure makes it possible to mount the guide carriage satisfactorily on the guide rail.

The back of the guide carriage is usually provided with a clamping face for clamping a machine part, for example. The machine part can be a tool or any desired other component. Said machine parts as a rule have a flat support face for resting on the clamping face of the back.

The possible applications of hydrostatic profiled rail guides of this type can be restricted by the fact that the limbs of the guide carriage can bend apart under a prevailing load. In this case, the pressure cushions which are built up in the pressure pockets cannot be maintained in some circumstances, with the result that satisfactory operation of the hydrostatic profiled rail guide is not ensured. Problems of this type can be eliminated, for example, by increasing the outer proportions of the guide carriage, with the result that the limbs of the guide carriage become more rigid. However, modifications of this type have the disadvantage that it is not possible to exchange profiled rail roller guides for hydrostatic profiled rail guides. The outer geometry of profiled rail roller guides is stipulated according to DIN 645-1. Known hydrostatic profiled rail guides cannot be used as a replacement for customary profiled rail roller guides, since a modification of the outer proportions is required in the case of comparable loadings of said hydrostatic profiled rail guides to ensure satisfactory operation, with the result that DIN 645-1 is not complied with.

It is an object of the present invention to specify a hydrostatic profiled rail guide in which proper operation is ensured.

According to the invention, this object is achieved in that the clamping face is arched concavely as viewed in the longitudinal direction of the guide rail. If the machine part is clamped onto this clamping face, it is tightened, for example, with screws. Said concavely shaped clamping face can be flattened during this tightening of the machine part, the back itself bending about a bending axis which is parallel to the longitudinal center axis of the guide carriage during this flattening, the free ends of the two limbs pivoting somewhat toward one another. When the machine part is bolted fixedly onto the clamping face of the guide carriage, a clearance between the guide rail and the guide carriage in the region of the bearing faces can be very small, for example from 5 to 10 μm. If this hydrostatic profiled rail guide is then pressurized, however, for example 100 bar, compressive forces which result in the two limbs of the guide carriage bending counter to their prestress act between the bearing faces of the guide rail and of the guide carriage. During this bending of the two limbs in the opposite direction, an ideal clearance which can be, for example, 25 μm is then set. That means that the desired clearances can be maintained under the provided operating loads between the bearing faces of the guide rail and of the guide carriage, even in the case of unfavorable loading of the hydrostatic profiled rail guide. No enlarged clearances are produced, with the result that no undesirably high volumetric flow of hydraulic fluid enters. This advantageous effect is made possible by the concavely shaped clamping face of the guide carriage, which concavely shaped clamping face makes a prestress which is introduced in a targeted manner possible in the back of the guide carriage, which prestress counteracts undesired contact of the limbs of the guide carriage. Defined bending of the back about an imaginary bending axis along the guide rail is possible by way of the profiled rail guide according to the invention.

The invention can also be described in other words by the fact that the clamping face is provided on both sides of the longitudinal center axis of the guide carriage with one clamping bar or clamping edge each, between which the clamping face is recessed. If the machine part is placed onto the guide carriage as described above, a spacing is formed between the flat support face of the machine part and the recessed clamping face of the back. If the machine part is then clamped to the guide carriage as shown above, the back is pulled with its clamping face in the direction of the flat support face of the machine part. As described above, the two limbs of the guide carriage pivot toward one another during this flattening of the concave or recessed clamping face of the back.

The guide carriage is preferably provided along its longitudinal center axis with a plurality of threaded holes which are arranged one behind another or with threaded shanks which protrude from the plane of the clamping face, in order to screw the machine part to the guide carriage. The screw forces which act on the screw connection act on the two limbs of the guide carriage with a lever arm which corresponds precisely to the spacing between the clamping edge and the longitudinal center axis.

It can be expedient for the proper design of the hydrostatic profiled rail guide according to the invention to define a first plane E1, in which the two clamping bars or edges are arranged. The recessed clamping face then lies in a plane E2 which is spaced apart from the plane E1. In the case of a concavely shaped clamping face, said concave clamping face is tangent to said plane E2. The spacing between said two planes E1 and E2 is then set in such a way that said spacing is reset to zero during clamping of the machine part onto the guide carriage. A stop size can therefore be defined by way of the set spacing h, with the result that the gap size between the bearing faces of the guide rail and of the guide carriage has a provided low spacing after this stop is reached. The desired clearance between said bearing faces is set only after the hydrostatic profiled rail guide according to the invention is pressurized.

BRIEF DESCRIPTION OF THE DRAWINGS

In the following text, the invention will be explained in greater detail using an exemplary embodiment which is depicted in a total of five figures, in which.

DETAILED DESCRIPTION OF THE INVENTION

Figure 1:
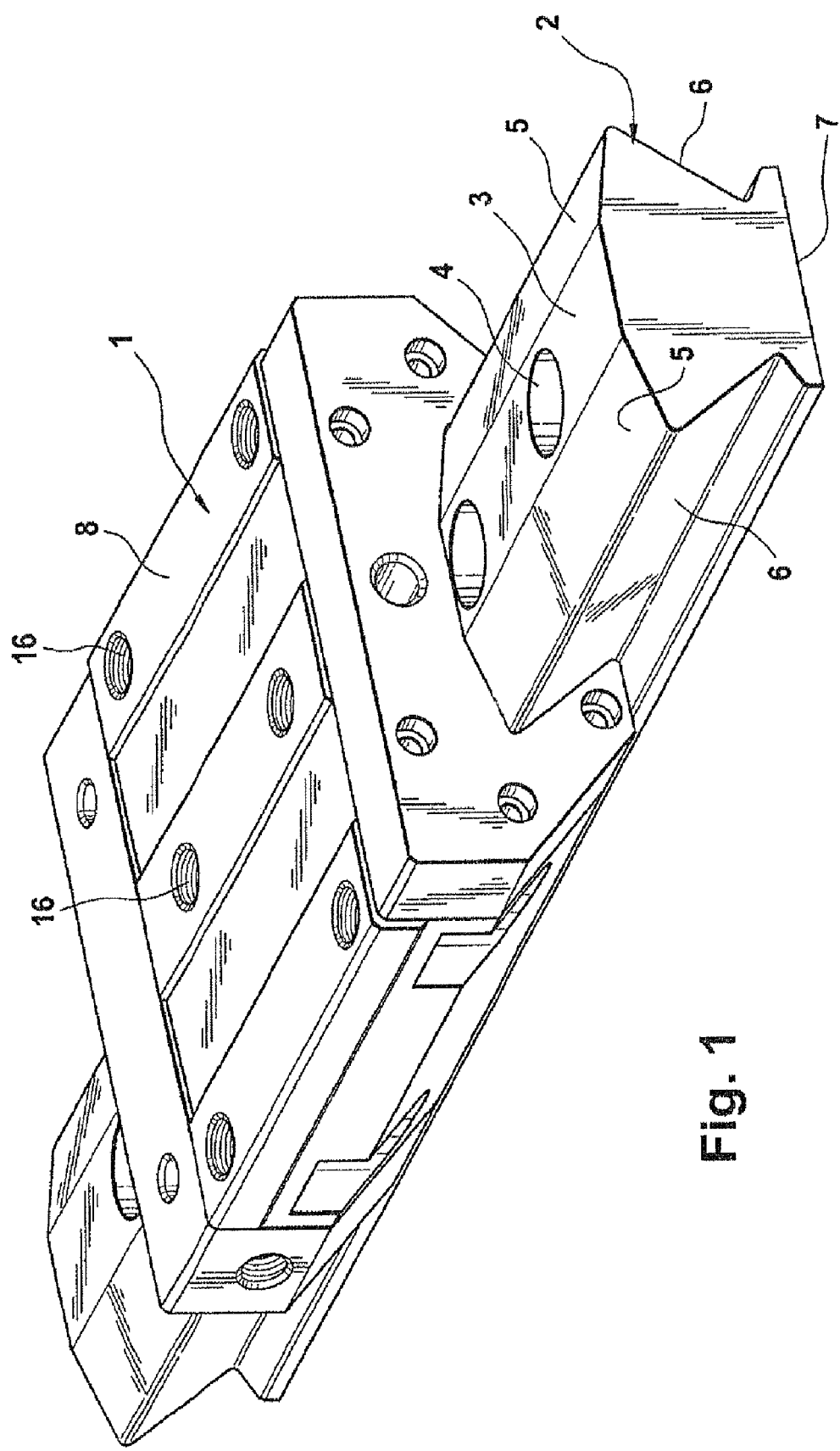
FIG. 1 shows a perspective illustration of a hydrostatic profiled rail guide according to the invention.

The profiled rail guide according to the invention which is depicted in FIGS. 1 to 5 comprises a guide carriage 1 which is mounted hydrostatically on a guide rail 2. The guide rail 2 has a head section which faces the guide carriage 1 and a foot section which faces a machine part (not depicted), on which the guide rail 2 is fastened. At its head section, the guide rail 2 is provided with a center face 3 along the longitudinal axis of the profiled rail guide. The guide rail 2 is provided with a multiplicity of through openings 4 which are arranged along the guide rail and through which fastening screws (not depicted here) are provided for fastening the guide rail to the machine part which is mentioned further above. Said through holes 4 penetrate the center face 3 of the guide rail 2.

At its head section, the guide rail 1 is provided with two upper bearing faces 5 and two lower bearing faces 6. The upper bearing faces 5 are of planar configuration; they are arranged such that they are inclined with respect to the center face 3, one upper bearing face 5 being arranged on one side of the center face 3 and the other upper bearing face 5 being arranged on the other longitudinal side of the center face 3. The lower bearing faces 6 are arranged below the upper bearing faces 5. These lower bearing faces 6 are arranged such that they are inclined both with respect to the center face 3 and also with respect to the upper bearing faces 5.

Figure 2:
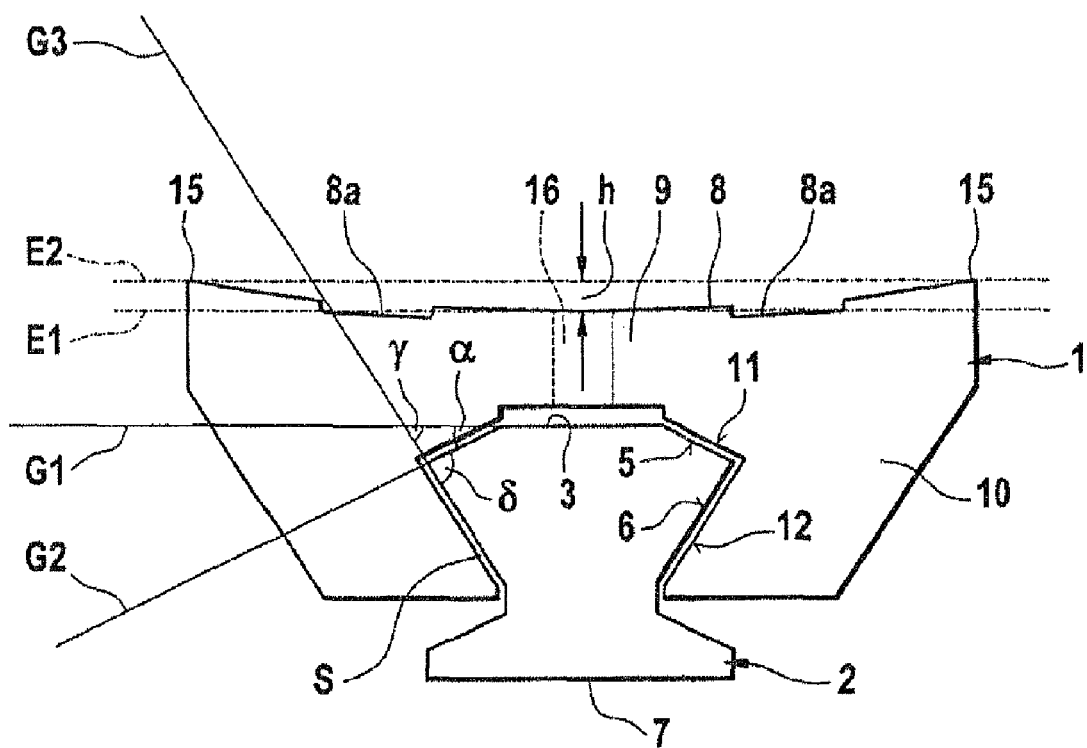
FIG. 2 shows a cross section through the hydrostatic profiled rail guide from FIG. 1.

FIG. 2 shows the hydrostatic profiled rail guide according to the invention in cross section. It can be seen here that the center face 3 is arranged parallel to a foot face 7 of the guide rail 2, said foot face 7 being the support face of the guide rail 2 for the machine part (not depicted here).

An imaginary first parallel straight line G1 to the center face 3 and an imaginary second parallel straight line G2 to the upper bearing face 5 and an imaginary third parallel straight line G3 to the lower bearing face 6 enclose a triangle. In this triangle, an angle α is formed between the first and the second straight lines G1 and G2. An angle γ is formed between the first and the third straight lines G1, G3. The angle α is set to values between 10° and 45° inclusive, and the angle γ is set to values of from 20° to 55° inclusive. An angle δ is formed at the point of intersection of the second and the third straight lines G2, G3, which angle δ can be determined purely arithmetically from the two abovementioned angles α and γ. By way of these angular ranges, on the one hand an optimum force distribution is set at the guide rail 2 and at the guide carriage 1. On the other hand, it has been proven that, in the case of these proposed angular ranges, the proportions of guide carriage and guide rail can be set in such a way that the stipulation of DIN 645-1 can be adhered to, the load capacity of the hydrostatic profiled rail guide according to the invention being comparable with a profiled rail roller guide of the same size.

Furthermore, it can be gathered from FIG. 2 that the straight line G1 is arranged at a parallel spacing from a clamping face 8 of the guide carriage 1, it being possible for tools, for example, to be placed onto said clamping face 8 and fastened to the guide carriage 1. According to the invention, said clamping face 8 is arched concavely, as is described in detail further below.

Further details of the guide carriage 1 can be gathered from FIG. 2: the guide carriage 1 has two limbs 10 which are connected integrally to one another by a back 9 and reach around the guide rail 2. The back 9 is firstly provided with two upper bearing faces 11 on its side which faces the guide rail 2, which two upper bearing faces 11 are arranged opposite the two upper bearing faces 5 of the guide rail 2 and parallel to the upper bearing faces 5 of the guide rail 2. Said upper bearing faces 11 are inclined in opposite directions. Secondly, the back 9 is provided with the abovementioned clamping face 8 according to the invention.

Each limb 10 of the guide carriage 1 is additionally provided with a lower bearing face 12 which is arranged opposite the lower bearing face 6 of the guide rail 2 and parallel to the latter. The two lower bearing faces 12 are arranged such that they are inclined in opposite directions and such that they are each inclined, both with respect to the upper bearing face 11 and with respect to the clamping plane 8.

Figure 3:
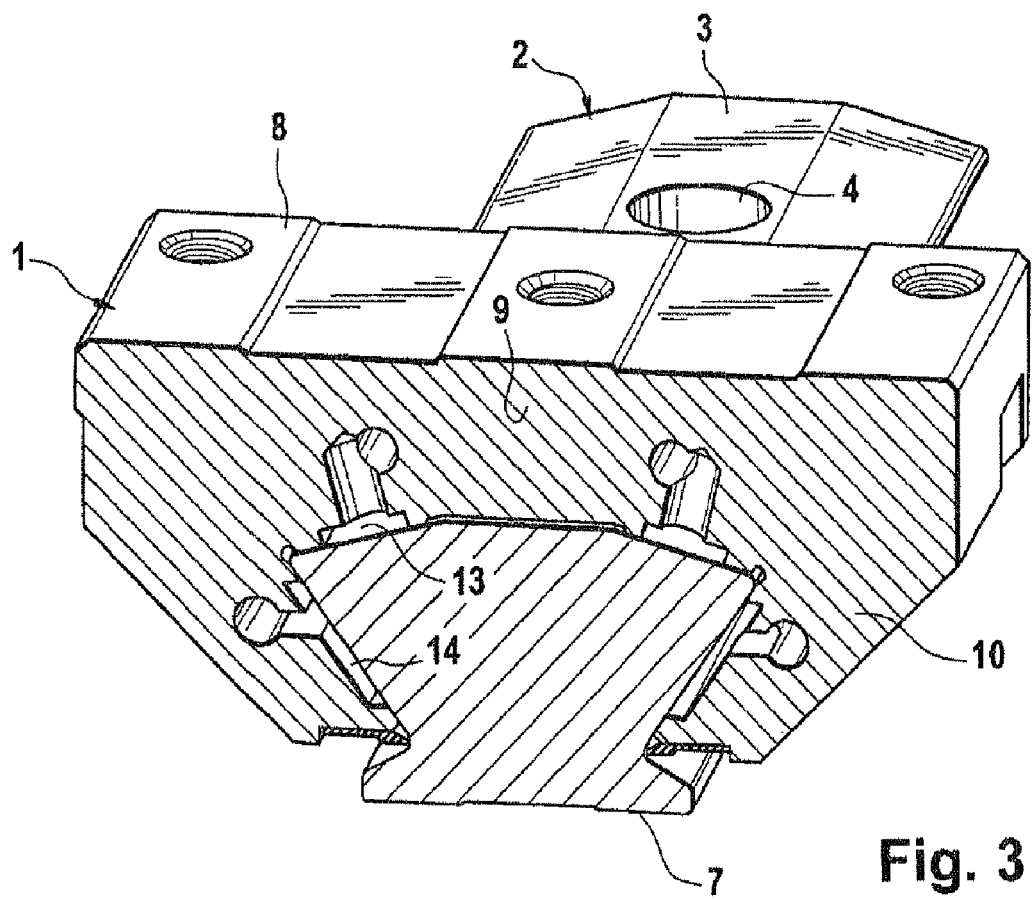
FIG. 3 shows a further cross section through the profiled rail guide according to the invention.

FIG. 3 shows a cross section through the hydrostatic profiled rail guide according to the invention, the sectional illustration here showing pressure pockets 13, 14 which are formed between the upper and lower bearing faces 5, 6, 11, 12 of the guide carriage 1 and the guide rail 2. Each of said four pressure pockets 13, 14 is provided with a dedicated flow control valve (not depicted here).

It can be gathered from FIG. 2 that the clamping face 8 is arched concavely. In this exemplary embodiment according to the invention, additional grooves 8a are formed which are formed parallel to the longitudinal center axis of the hydrostatic profiled rail guide. However, it is sufficient also to configure the concavely shaped clamping face 8 which is depicted here without said grooves 8a.

The concave clamping face 8 is tangent to a plane E1. Clamping edges 15, on which a machine part which is to be screwed on comes into contact initially, are formed on both longitudinal sides of the guide carriage. Said two clamping edges 15 lie in a plane E2 which is arranged parallel to the plane E1. A spacing h is formed between said two planes E1 and E2.

The guide carriage 1 is provided with a plurality of threaded holes 16 along the longitudinal center axis of the hydrostatic profiled rail guide. FIG. 1 shows said threaded holes in a perspective illustration. The guide carriage 1 is configured in such a way that the back 9 is bent in the direction of the machine part (not depicted here) during bolting down said machine part with the guide carriage. That means that the spacing h between said two planes E1 and E2 is reset to zero during bolting down the machine part to the guide carriage. If the clamping face 8 is flattened, a clearance S between the bearing faces of the guide rail 2 and of the guide carriage 1 is reduced in the region of the lower bearing faces 6, since the two limbs 10 pivot toward one another with their free ends when the machine part is screwed to the guide carriage 1.

Figure 4:
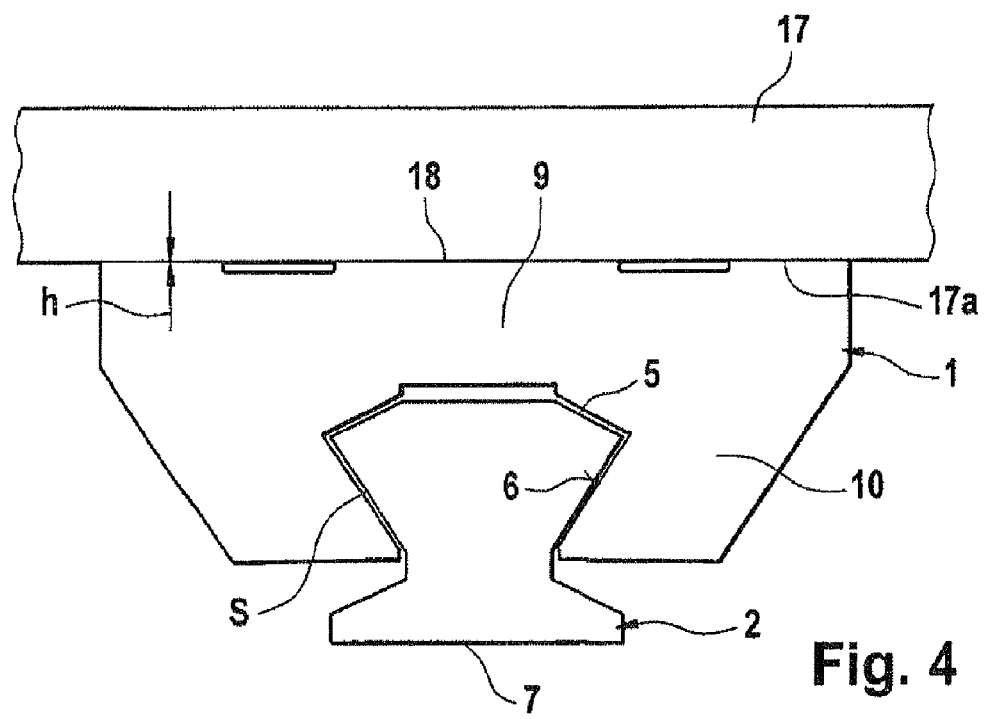
FIG. 4 shows the profiled rail guide according to the invention with a clamped machine part, in the pressureless state.

FIG. 4 shows the hydrostatic profiled rail guide according to the invention with an indicated machine part 17 which has already been screwed fixedly to the guide carriage 1. A support face 17a of the machine part 17 is provided, against which support face 17a the clamping face 8 of the guide carriage 1 bears. It can be gathered from the Figure that the spacing h between these two planes E1 and E2 has been reset to zero. Furthermore, it can be gathered from FIG. 4 that the clearance S is reduced in the region of the free limb ends, in the region of the lower bearing faces 6.

Figure 5:
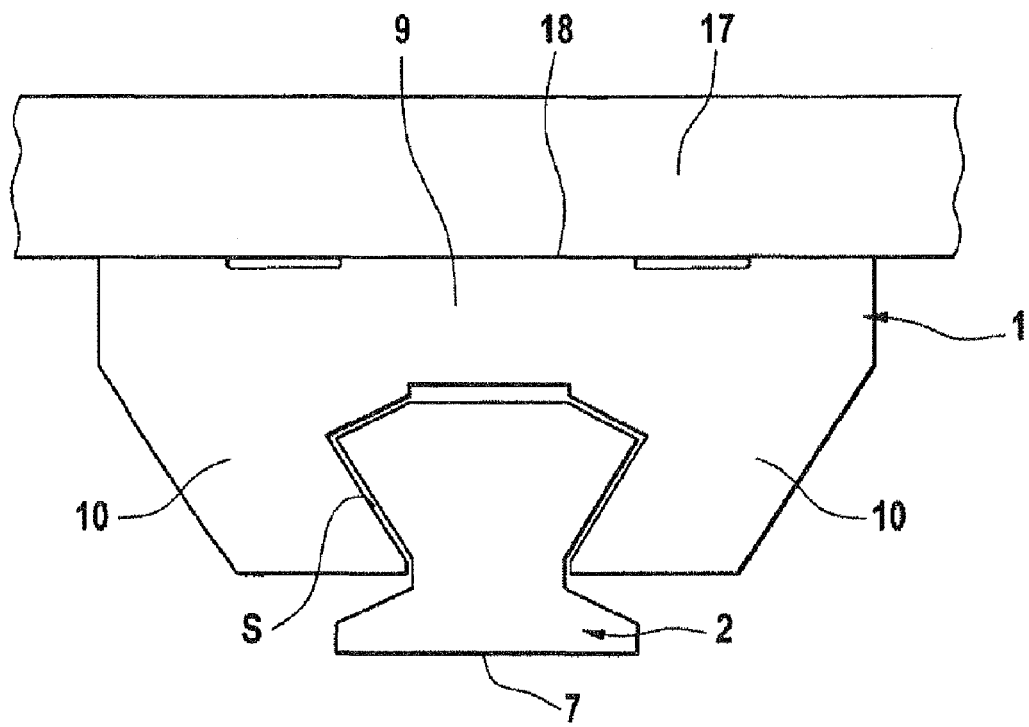
FIG. 5 shows the profiled rail guide according to the invention from FIG. 4, but pressurized.

In the illustration according to FIG. 5, the profiled rail guide according to the invention according to FIG. 4 has been pressurized, for example 100 bar. It can then be gathered from FIG. 5 that an ideal clearance S, which is approximately 25 μm in the present case, is set in the region of the lower bearing faces under this prevailing pressure. The increase of said clearance with respect to the clearance according to FIG. 4 results from the prevailing pressure forces in the bearing gap, pressure forces pressing against the limbs 10 and bending the latter open. The hydrostatic profiled rail guide according to the invention is designed in such a way that bending of the two limbs is limited to a permissible clearance S at operating pressures and under operating loadings.

Figure 6:
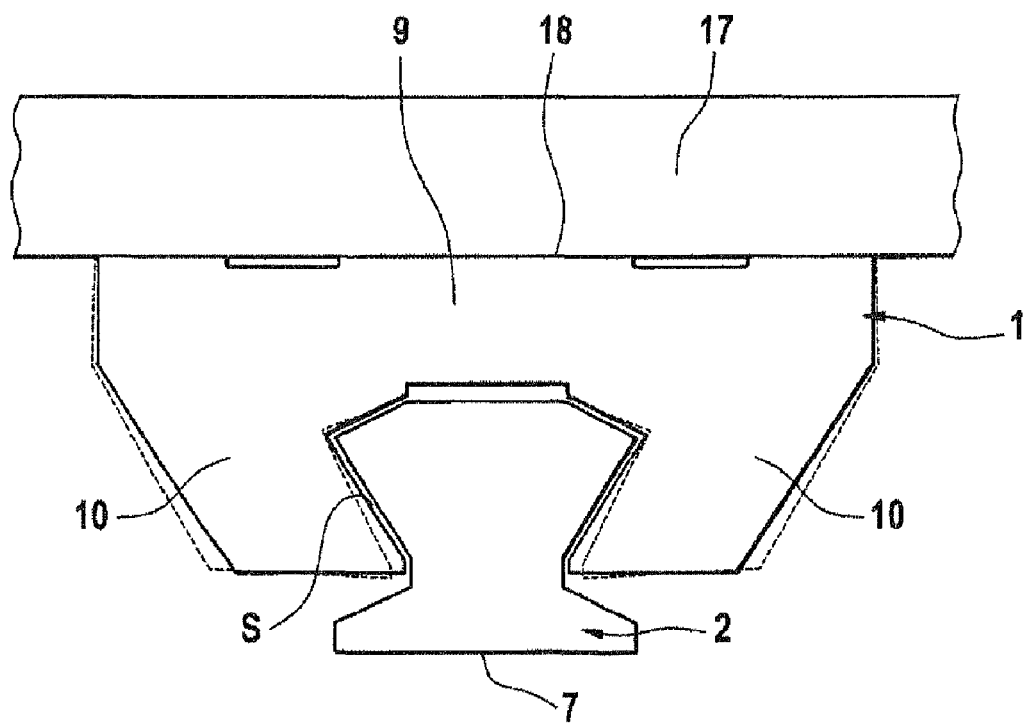
FIG. 6 shows a cross section through a known profiled rail guide.

FIG. 6 shows a conventional hydrostatic profiled rail guide, in which a clamping face 18 of the guide carriage 1 is only of flat configuration. In the case of a machine part 17 which is screwed fixedly to the guide carriage 1, a provided clearance S as indicated in FIG. 6 is set in the case of a pressureless hydrostatic profiled rail guide. If said conventional hydrostatic profiled rail guide is then pressurized, the two limbs 10 of the guide carriage 1 are bent away from one another. That means that the clearance S increases, which is indicated in FIG. 6 by a dashed depiction of the guide carriage. However, this increase in the clearance S can have the consequence of an impermissibly high volumetric flow of hydraulic fluid in an undesired way.

LIST OF DESIGNATIONS

1 Guide carriage
2 Guide rail
3 Center face
4 Through opening
5 Upper bearing face
6 Lower bearing face
7 Foot face
8 Clamping face
8a Grooves
9 Back
10 Limb
11 Upper bearing face
12 Lower bearing face
13 Pressure pocket
14 Pressure pocket
15 Clamping edge
16 Threaded hole
17 Machine part
18 Clamping face

The invention claimed is:

1. A carriage for mounting on a guide rail, the carriage comprising:
   a horizontally oriented back and two side limbs, extending vertically from the back, the back positioned between the two limbs;
   the back having an inner surface for facing a guide rail and an outer surface, opposite the inner surface for mounting a machine part thereon, the inner surface having two upper bearing surfaces for opposing corresponding bearing surfaces on the guide rail;
   each of the two limbs having a lower bearing surface for opposing corresponding lower bearing surfaces on the guide rail;
   each of the two upper bearing surfaces of the back having a pressure pocket for hydrostatic fluid;
   each lower bearing surface of each of the two limbs having a pressure pocket for hydrostatic fluid;
   the outer surface of the back having a clamping face for clamping the machine part, the clamping face being concavely arched to form a center recess such that the clamping face has edges which are parallel to a longitudinal center axis of the carriage and vertically above the center recess of the face, the center recess being parallel to the center axis of the carriage;
   each of the two limbs having a distal end which flex and pivot toward each other without contacting each other such that a horizontal distance between each distal end of the two limbs is smaller when the machine part is clamped to the clamping face than when the machine part is not clamped to the clamping face.

2. The carriage as claimed in claim 1, wherein the back of the guide carriage has a plurality of threaded holes which are arranged behind one another.

3. The carriage as in claim 1, wherein the guide carriage has two longitudinal sides and the edges of the clamping face are mateable with the machine part along the two longitudinal sides of the guide carriage, the machine part having a flat support face for resting on the clamping face of the guide carriage.

4. The carriage as claimed in claim 3, wherein the clamping face is tangent to a first plane and the edges of the clamping face are arranged in a second plane, which is spaced from and parallel to the first plane.

* * * * *